United States Patent
Dou

(10) Patent No.: US 10,303,747 B2
(45) Date of Patent: May 28, 2019

(54) METHOD, APPARATUS AND SYSTEM FOR CONTROLLING ADDRESS INPUT

(71) Applicant: Tencent Technology (Shenzhen) Co., Ltd., Shenzhen, Guangdong (CN)

(72) Inventor: Ningjun Dou, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 796 days.

(21) Appl. No.: 14/274,117

(22) Filed: May 9, 2014

(65) Prior Publication Data

US 2014/0351681 A1    Nov. 27, 2014

Related U.S. Application Data

(63) Continuation of application No. PCT/CN2014/072563, filed on Feb. 26, 2014.

(30) Foreign Application Priority Data

May 22, 2013 (CN) .......................... 2013 1 0192457

(51) Int. Cl.
*G06F 17/22* (2006.01)
*G06F 17/27* (2006.01)
*G06F 16/955* (2019.01)

(52) U.S. Cl.
CPC ...... *G06F 17/2235* (2013.01); *G06F 16/9566* (2019.01); *G06F 17/2223* (2013.01); *G06F 17/276* (2013.01)

(58) Field of Classification Search
None
See application file for complete search history.

(56) References Cited

U.S. PATENT DOCUMENTS

| 6,314,469 B1 * | 11/2001 | Tan ...................... H04L 61/1511 704/8 |
| 8,024,319 B2 * | 9/2011 | Gao .................. G06F 17/30864 707/711 |
| 8,135,580 B1 * | 3/2012 | Jin ........................ G06F 17/275 704/7 |

(Continued)

FOREIGN PATENT DOCUMENTS

| CN | 101539949 A | 9/2009 |
| CN | 101887446 A | 11/2010 |

(Continued)

OTHER PUBLICATIONS

W3C An Introduction to Multilingual Web Addresses, Published 2008, pp. 1-11 (Year: 2008).*

(Continued)

*Primary Examiner* — Howard Cortes
(74) *Attorney, Agent, or Firm* — Brinks Gilson & Lione

(57) ABSTRACT

The embodiments disclose a method and system for controlling address input. The method includes: receiving an event of characters input to an address input; matching the characters input to one or more pre-stored Uniform Resource Locator (URL) entries, and generating a URL entry which includes the characters input; and in response to the URL entry from among the one or more matched pre-stored URL entries, linking a particular matched pre-stored URL entry to a corresponding web page.

18 Claims, 5 Drawing Sheets

(56) References Cited

U.S. PATENT DOCUMENTS

| | | | | |
|---|---|---|---|---|
| 8,271,265 | B2* | 9/2012 | Kim | G06F 17/2223 704/10 |
| 8,930,360 | B2* | 1/2015 | Ying | G06F 17/30967 707/708 |
| 2002/0046257 | A1* | 4/2002 | Killmer | G06F 17/30873 709/218 |
| 2002/0152258 | A1* | 10/2002 | Zhou | G06F 17/275 709/201 |
| 2003/0115040 | A1* | 6/2003 | Xing | G06F 17/275 704/8 |
| 2005/0240576 | A1* | 10/2005 | Piscitello | G06F 17/30657 |
| 2006/0112094 | A1* | 5/2006 | Sullivan | G06F 17/30887 |
| 2007/0266024 | A1* | 11/2007 | Cao | G06F 17/3087 |
| 2010/0005086 | A1* | 1/2010 | Wang | G06F 3/018 707/E17.014 |
| 2010/0185644 | A1* | 7/2010 | Gutt | G06F 17/30864 707/759 |
| 2010/0274553 | A1* | 10/2010 | Raisch | G06F 17/2223 704/2 |
| 2014/0100845 | A1* | 4/2014 | Hoskinson | H04L 61/3035 704/8 |

FOREIGN PATENT DOCUMENTS

| | | |
|---|---|---|
| CN | 102307263 A | 1/2012 |
| CN | 102819384 A | 12/2012 |
| CN | 102880711 A | 1/2013 |
| CN | 102819384 B | 11/2015 |

OTHER PUBLICATIONS

International Preliminary Report on Patentability and Written Opinion received in PCT Application No. PCT/CN2014/072563 dated Nov. 24, 2015.

International Search Report received in PCT Application No. PCT/CN2014/072563 dated Jun. 5, 2014.

Office Action dated Sep. 30, 2017 for Chinese Application No. 201310192457.2, 7 pages.

Office Action for corresponding Chinese Application No. 201310192457.2, dated Jun. 5, 2018, 7 pages.

\* cited by examiner

METHOD, APPARATUS AND SYSTEM FOR CONTROLLING ADDRESS INPUT

CROSS-REFERENCE TO RELATED APPLICATIONS

The application is a continuation of PCT Application No. PCT/CN2014/072563, filed on Feb. 26, 2014, which claims priority to Chinese Patent Application No. 201310192457.2, filed on May 22, 2013, which are incorporated by reference in their entireties.

FIELD OF THE TECHNOLOGY

The present disclosure relates to a method and a system for controlling address input. Such address input may or may not include Chinese characters, and the wherein the address input being through anyone of: a terminal browser interface, a voice command interface, a web application or a native application, to name a few.

BACKGROUND

The majority of mainstream browser systems, such as Internet Explorer (IE) browser system and Google Chrome browser system receive English characters as input to an address bar of a browser. Accordingly, non-English inputs (such as in Chinese characters) would need to be at least phonetically translated into English characters for matching to URL entries based on similar spellings.

Some browser systems may develop URL entry matching of non-Chinese characters input which is received in the input box of the address bar. However, such browser systems cannot perform direct URL entry matching with the inputted Chinese characters. For example, when Chinese characters are inputted in the input box of the address bar, these browser systems can only develop searching aiming at an exact input match to the correct Chinese characters. In other words, if a user knows only the Chinese name of a certain web page, but does not know or cannot spell in English the exact characters for the correct URL entry, the search result will lead to many irrelevant websites having the incorrectly spelled URL entry. Thus, the current browser system is quite limited in its popularity in terms of searching for URL entries in non-English characters, such as Chinese characters input.

SUMMARY

The present disclosure discloses a method and system for controlling address input. In an aspect of the disclosure, the method includes: receiving an event of characters input to an address input; matching the characters input to one or more pre-stored Uniform Resource Locator (URL) entries, and generating a URL entry which comprises the characters input; and in response to the URL entry from among the one or more matched pre-stored URL entries, linking a particular matched pre-stored URL entry to a corresponding web page.

Another aspect of the disclosure discloses a system which may include at least a processor operating in conjunction with at least a memory which stores instruction codes operable as plurality of modules, wherein the plurality of modules may include: an input detecting module, which detects an event of characters input to an address input a URL matching module, which matches the characters input to one or more pre-stored Uniform Resource Locator (URL) entries, and generating a URL entry which includes the characters input; and a link control module, which responds to the URL entry from among the one or more matched pre-stored URL, linking the particular matched pre-stored URL entry to a corresponding web page.

Yet in another embodiment, the disclosure discloses a non-transitory computer-readable medium having stored thereon, a computer program having at least one code section being executable by a mobile terminal which causes the mobile terminal to perform steps for controlling address input. The exemplary steps include: receiving an event of characters input to an address input; matching the characters input to one or more pre-stored Uniform Resource Locator (URL) entries, and generating a URL entry which comprises the characters input; and in response to the URL entry from among the one or more matched pre-stored URL entries, linking a particular matched pre-stored URL entry to a corresponding web page.

The method implements matching pre-stored URL entries after detecting that there are characters input event (Chinese characters and non-Chinese characters) in the input. A URL entry list is generated (for user's selection or automatic selection by the terminal) according to the matched URL entries, such that the terminal may select and match the pre-stored URL entries and accordingly direct URL website links which match the characters input.

The implementation of the method and system in the present disclosure, in effect, enables the terminal to both search for matched characters input (Chinese characters and non-Chinese characters) and directly matching the characters input to a URL entry. The implementation of the present disclosure therefore simplifies and speeds up accurate URL websites matching operations when the characters information is being input to the terminal. The characters input may be through a browser interface address bar, a voice command, a web application or through a native application running in the terminal. The same method may be applied to browsers of non-Chinese characters input, using pre-stored URL entries in the respective language characters.

BRIEF DESCRIPTION OF THE DRAWINGS

The accompanying drawings are included to provide a further understanding of the claims and disclosure, are incorporated in, and constitute a part of this specification. The detailed description and illustrated embodiments described serve to explain the principles defined by the claims and may not be construed in a limited sense.

DETAILED DESCRIPTION OF THE EMBODIMENTS

The various embodiments of the present disclosure are further described in details in combination with attached drawings and embodiments below. It should be understood that the specific embodiments described here are used only to explain the present disclosure, and are not used to limit the present disclosure. In addition, for the sake of keeping description brief and concise, the newly added features, or features that are different from those previously described in each new embodiment will be described in details. Similar features may be referenced back to the prior descriptions. Alternately, features in higher numbered drawings may be referenced to in order to provide further details to the description in the currently described drawing. It should be understood that the embodiments described herein are merely examples to illustrate the present disclosure without limitations to their scope.

A glossary is provided below to define a general meaning of the terms used in the disclosure:

Address bar: It refers to an interface control portion of a browser on a terminal. After clicking to open, a URL entry may be inputted to access a certain website URL entry: It refers to a combination of data including a URL website and a title corresponding to the URL website. For example, "www.sina.com (Sina)", "www.qq.com (Tencent)", etc. Wherein, "www.sina.com" represents the URL website of "www.sina.com (Sina)", and "Sina" represents the title corresponding to the www.sina.com website; and "www.qq.com" represents the URL website of "www.qq.com (Tencent)", and "Tencent" represents the title corresponding to the www.qq.com website.

Historical URL entry: It refers to a combination of data including a web page URL website and a corresponding title accessed by inputting certain characters in the address bar and pressing the "Enter" key, or accessed by opening other link on an opened web page. In brief, the combined data includes a historically accessed page URL and a corresponding title.

URL entry from bookmark or favorites: It refers to the combined data of a URL and its corresponding title saved by a user.

URL entry of frequently visited websites: It refers to the combined data of some frequently visited website URLs on the Internet and the corresponding titles, such as "www.sina.com (Sina)", "www.qq.com (Tencent)", etc. which have been pre-stored in a browser or downloaded from a server.

Figure 1:
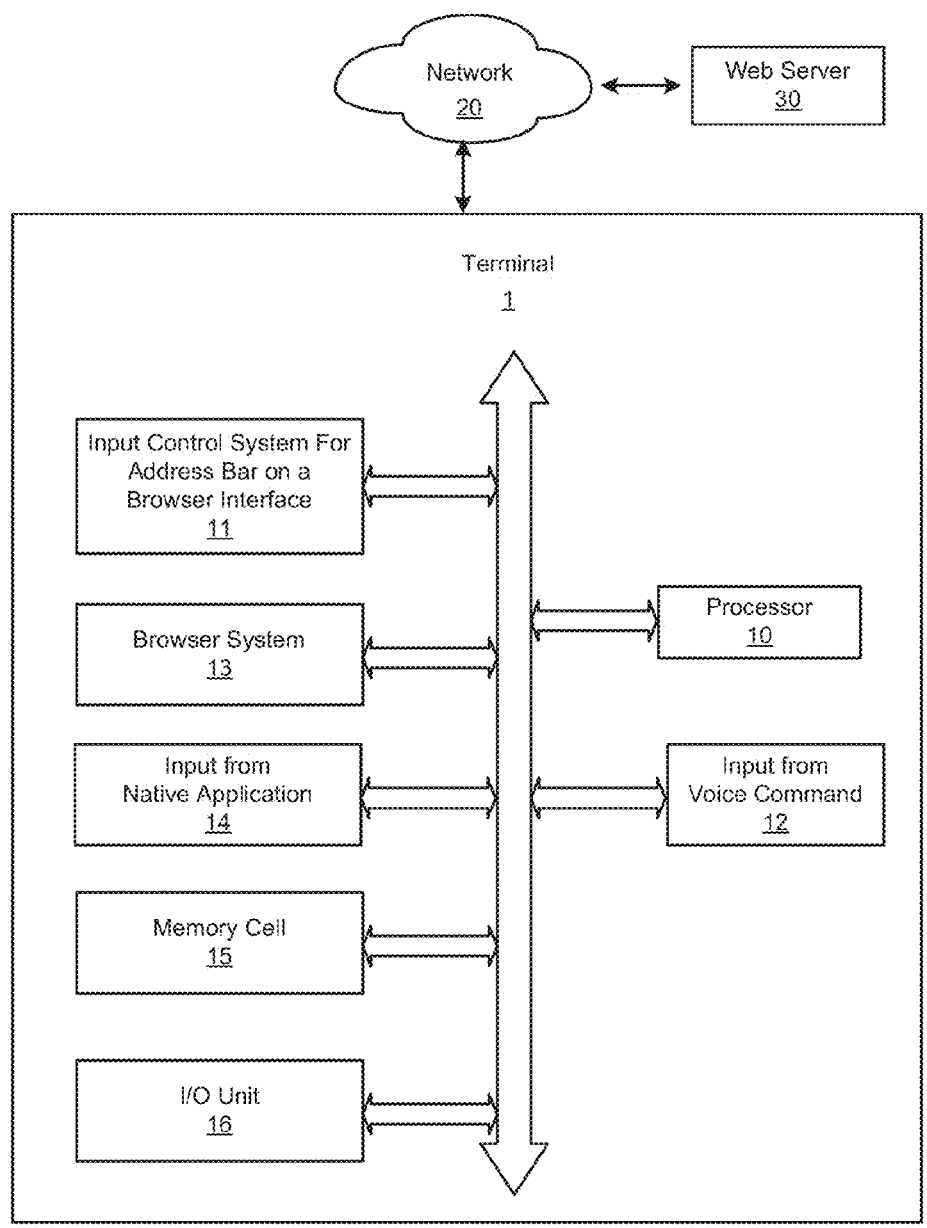
FIG. 1 is an exemplary functional block diagram of an apparatus or a terminal which performs the method, according to an embodiment of the present disclosure.

FIG. 1 is an exemplary functional block diagram of an apparatus or a terminal (1) which performs the method, according to an embodiment of the present disclosure. As shown in FIG. 1, terminal (1) may include at least a processor (10), a memory cell (15), a browser system (13), an input/output (I/O) unit (16) and an input control system for address bar on a browser interface (11), a native application (14) running in the terminal (1) or a voice command interface (12). The terminal (1) may be a smart phone, mobile terminal such as a tablet PC, a computer or any other applicable electronic equipment which may connect to a web server (30) through a network (20).

In an embodiment, the input/output unit (16) may enable a user to input characters or commands to a browser interface (11) under the control of a browser system (13) (such as a QQ browser system) and output data of the browser system (13) in response to the user's input command.

Figure 4:
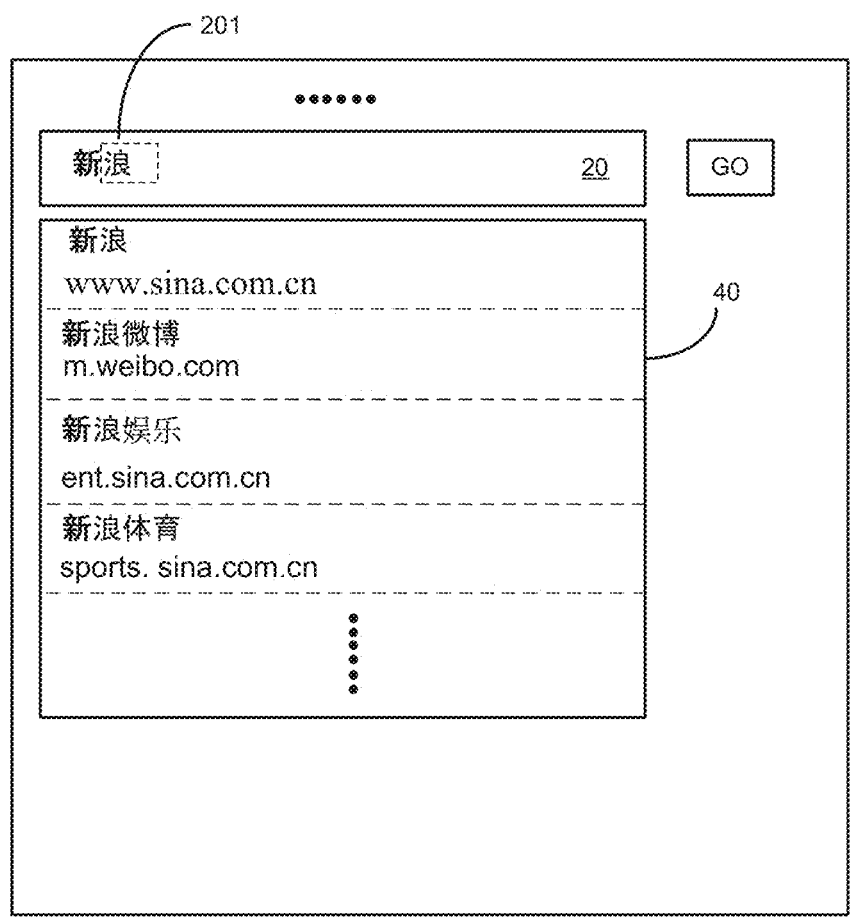
FIG. 4 illustrates an exemplary method of matching URL entries to Chinese characters input to the input box address bar of the browser interface, according to an embodiment of the present disclosure.
Figure 5:
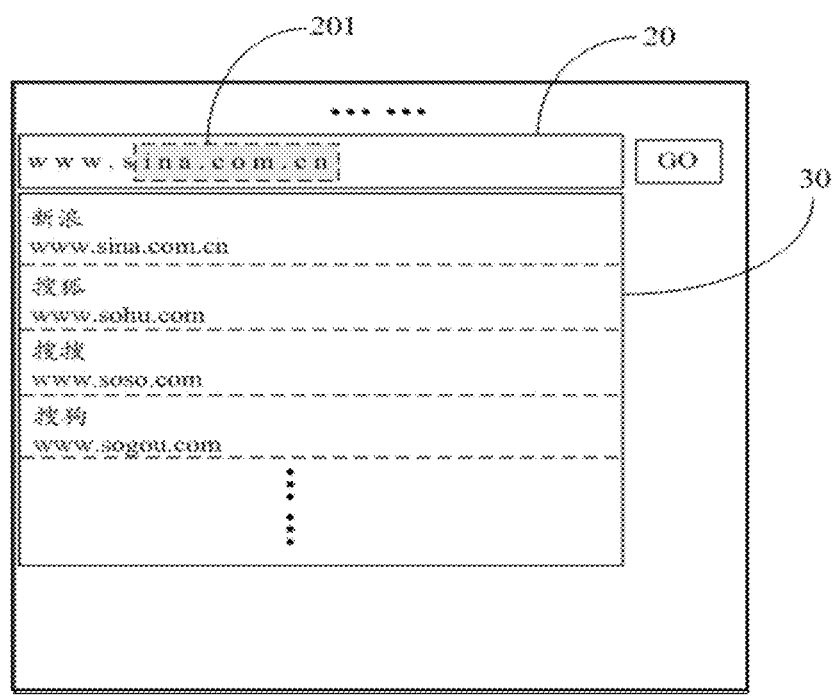
FIG. 5 illustrates an exemplary method of matching URL entries to non-Chinese characters input to the address bar input of the browser interface, according to an embodiment of the present disclosure.

The browser interface (11) may include an input box (20) address bar of the browser interface (11) (such as the input box (20) of address bar as shown in FIG. 4 and FIG. 5). Alternately, the input characters may be generated through a voice command interface (12), a running native application (14), or the input characters may even be generated by a running web application from the web server (30).

The memory cell (15) may store the codes which execute the browser system (13) and the input control system for address bar on browser interface (11), and their respective operating data. It should be pointed out that the memory cell (15) may be one or more individual memory devices on the terminal (1).

The processor (10) may be a processing unit, which calls and executes codes to implement the browser system (13) to realize the functions of the browser interface (11), such as input control system for address bar on browser interface (11).

Figure 2:
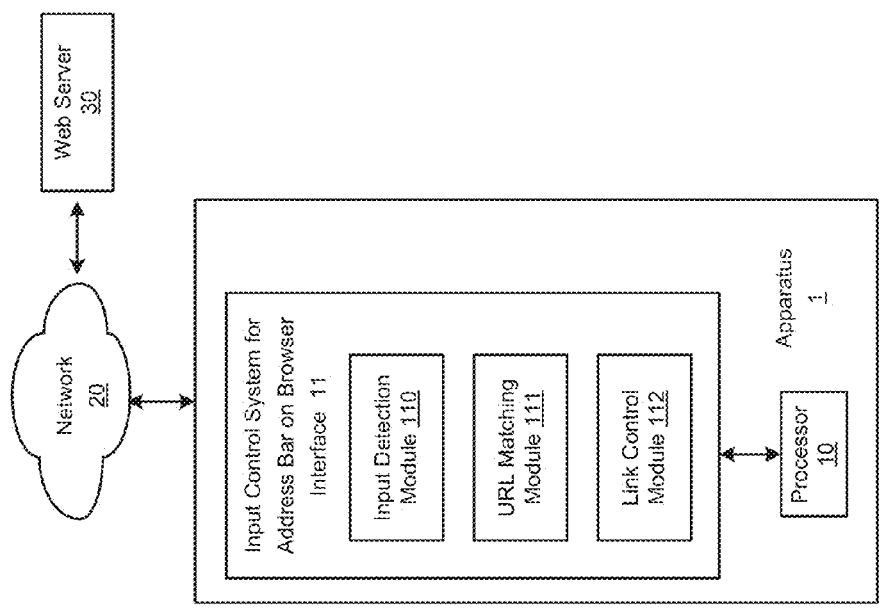
FIG. 2 discloses in detail a portion of the exemplary functional block diagram which performs input control to an address bar on a browser interface as shown in FIG. 1, according to an embodiment of the present disclosure.

FIG. 2 discloses in detail a portion of the exemplary functional block diagram which performs input control to an address bar on a browser interface (11) as shown in FIG. 1, according to an embodiment of the present disclosure.

More specifically, the input control system for address bar on browser interface (11) may include an input detection module (110), a URL matching module (111) and a link control module (112).

The input detecting module (110) may detect a character input event in the input box of the address bar on the browser interface (such as the input box (20) of address bar as shown in FIG. 4 and FIG. 5). In an embodiment, the characters input may include one or both of Chinese characters or non-Chinese characters. It should be pointed out that the input detecting module (110) may be configured to analyze whether the characters inputted in the input box (20) of address bar pertains to Chinese characters or not.

The URL matching module (111) may match the non-English characters input to one or more pre-stored Uniform Resource Locator (URL) entries, and generating a URL entry list comprising one or more matched pre-stored URL entries which comprises Chinese and non-Chinese characters for user's selection, wherein the non-Chinese characters comprising at least one of: English characters, Korean characters, Japanese characters, Spanish characters, French characters, German characters, Hebrew characters and Arabic characters, to name a few. For the purpose of illustrations, Chinese and English characters may be used in the disclosed examples. It should be pointed out that the detecting module (110) may detect characters input from a combination of different languages.

The URL matching module (111) may match the pre-stored URL entities for the inputted Chinese characters and generate a URL entity list for user's selection according to the matched URL entities. For example, the method of matching pre-stored URL entities with the inputted Chinese characters may include: the URL matching module (111) matching to different titles, all of which include the inputted Chinese character "新" (phonetically pronounced as "XIN"). Such titles may include: "新浪" (i.e., "Sina"), "新浪微博" (i.e., "Sina Microblog"), "新浪娱乐" (i.e., "Sina Entertainment"), and "新浪体育" (i.e., "Sina Sports"), etc. As seen, all of the above Chinese titles include the inputted Chinese character "新" (phonetically pronounced as "XIN"). Accordingly, the URL matching module (111) may match the pre-stored URL entities corresponding to the matched titles having the inputted Chinese character "新".

As shown in FIG. 4, after inputting the Chinese character of "新" in the input box (20) of address bar, the matched pre-stored URL entities corresponding to the Chinese character of "新" may include the corresponding matched pre-stored URL entities "www.sina.com.cn" (i.e., sina or 新浪), "m.weibo.com" (i.e., Sina Microblog or 新浪微博), "ent.sina.com.cn" (i.e., Sina Entertainment or 新浪 娱乐), "sports.sinacom.cn" (i.e., Sina Sports or 新浪体育), etc.

The methods of generating a URL entity list according to the matched pre-stored URL entities may vary. Some of the steps may include: setting the matched title corresponding to the pre-stored URL entry being the pre-stored URL entry matching to the non-English characters input, categorizing the pre-stored URL entries into different URL entry priority sets, wherein the URL entry priority sets comprise sets of common web sites URL entries; categorizing a respective priority for each of the pre-stored URL entries; and generating the URL entry list according to a respective priority order of the matched pre-stored URL entry in a high-to-low order according to their priorities. The following exemplary steps may be implemented in the following orders:

Step A: firstly, setting the matched title corresponding to the pre-stored URL entry being the pre-stored URL entry matching to the non-English characters input. Categorizing URL entry sets of different priorities for the pre-stored URL entries by types. For example, two URL entry sets of different priorities may be set as: a set of historical URL entries of the browser (recorded as "Set 1") and another set of URL entries of bookmark or favorites (recorded as "Set 2"), respectively; wherein, the order of priority for Set 1 and Set 2 may be either Set 1 having a higher priority over Set 2 or vice versa.

In order to realize the matching of the URL entries of frequently visited or common websites with the characters inputted in the input box (20) of address bar, the pre-stored URL entry sets may include the sets of URL entries of the frequently visited or the common websites. For example, three URL entry sets of different priorities may be set: a set of historical URL entries of the browser (recorded as "Set 1"), a set of URL entries of bookmark or favorites (recorded as "Set 2"), and a set of URL entries of the frequently visited or common websites (recorded as "Set 3"), respectively. The order of priority for Set 1, Set 2 and Set 3 may be categorized as Set 1 having a higher priority over Set 2, or vice versa, and the order of priority for Set 2 and Set 3 may be categorized as Set 2 having a higher priority over Set 3, or vice versa.

If the pre-stored URL entry sets include the set of historical URL entries, the URL matching module (111) may record and save the URL data inputted and accessed by the user through the input box (20) of address bar.

Step B: setting or categorizing a respective priority for each of the pre-stored URL entries. For example, the rule for setting priority may be: the priority of URL entry, such as "www.sina.com.cn" (i.e., sina or 新浪) which has a beginning portion starting with the URL or title matched to the inputted Chinese character "新" or www.si, would have a higher priority than the other URL entries (such as "www.baidu.com (Baidu)), which has a beginning portion starting with the inputted Chinese character "度" (pronounced as "du"), of which the URL or a remaining part of title other than the beginning may be matched.

The skilled in the art may provide details to further refine the rules for priority settings, for example, providing a priority between the URL entries, of which the URL entry or the portion of title other than beginning portion being matched with the inputted Chinese character. For example, a higher priority may be given to a URL with a higher number of historical visits or accesses.

In another example, the rule for priority setting may also be based on: setting a higher priority of URL entry which has a domain name beginning with the inputted character starting with such as "s", over URL entries with the domain name which includes the inputted character "s", but the domain name does not begin with the inputted character "s".

Step C: generating the URL entry list according to a respective priority order of the matched pre-stored URL entry in a high-to-low order according to their priorities (such as the URL entry list (40), as shown in FIG. 4 and the URL entry list (30), as shown in FIG. 5).

For example, the Chinese character "新" (pronounced as "Xin") may be inputted to the input box (20) of the address bar. Various matched pre-stored URL entries, including "www.sina.com.cn" (i.e., sina or 新浪), "m.weibo.com" (i.e., Sina Microblog or 新浪微博), "ent.sina.com.cn" (i.e., Sina Entertainment or 新浪 娱乐), "sports.sina.com.cn" (i.e., Sina Sports or 新浪体育), etc. may be found.

The "www.sina.com.cn" (i.e., sina or 新浪) URL entry may belong to Set 1, the "m.weibo.com" (i.e., Sina Microblog or 新浪微博) and "ent.sina.com.cn" (i.e., Sina Entertainment or 新浪娱乐) URL entries may belong to Set 2, and "sports.sina.com.cn" (i.e., Sina Sports or 新浪体育) URL entry may belong to Set 3. Accordingly, the URL entry "www.sina.com.cn (新浪)" may have the highest priority among all the matched URL entries due to Set 1 being the highest priority according to the priority rule (as shown being in the first place in the generated URL entity list (40) in FIG. 4, and in the generated URL entity list (30) as shown in FIG. 5).

Furthermore, in order to reduce the number of input operations by the user to the input box (20) of the address bar on the browser interface (11), the URL matching module (111) may perform the following: when it is determined that the characters input includes non-English characters (such as the inputted Chinese character "新" (phonetically pronounced as "XIN")), the URL matching module (111) may match the non-English characters input (i.e., the inputted Chinese character "新") to one or more pre-stored URL entries, and generating a URL entry list including one or more matched pre-stored URL entries which includes the non-English characters (i.e., having the inputted Chinese character "新" for user's selection.

More specifically, the inputted characters, i.e., the Chinese character "新" (having a URL title beginning with "www.s") may be matched to the beginning of URL or title of the URL entry having "s" (such as "www.sina.cn (Sina)") in a specific position (such as the beginning position) in the generated URL entity list. Afterwards, the Chinese character "浪" (phonetically pronounced as "LANG"), may be appended to complement "s" (i.e., the character "新") to form the remaining portion (such the title (201) "ina.com.cn" as shown in FIG. 4 or shown in FIG. 5) of the URL entry www.sina.com.cn (新浪).

In other words, the appended portion "浪" or "ina.com.cn" other than the beginning portion, is the remainder portion of the title (201) of the URL entry in the specific position following the starting characters input (such as the Chinese character of "浪" shown in FIG. 4 or "www.s" shown in FIG. 5) in the input box (20) of the address bar on the browser interface (11).

Furthermore, in order to realize matching to non-Chinese characters (such as "www.s" as shown in FIG. 5) to the pre-stored URL entry inputted in the input box of address bar, the URL matching module (111) may determine whether the characters input are non-Chinese characters. When it is determined that the characters input being the non-Chinese characters input, matching the non-Chinese characters input to the one or more pre-stored Uniform Resource Locator (URL) entries, and generating a URL entry list comprising one or more matched pre-stored URL entries which comprises non-Chinese characters for user's selection.

In another embodiments of the present disclosure, when non-Chinese characters (such as English characters of "www.s" as shown in FIG. 5) are inputted in the input box (20) of the address bar, the matching with the pre-stored URL entries may not need to be performed using the pre-stored URL entries in Chinese characters. Instead, the same method may be configured to pre-stored URL entries in other non-Chinese language characters, such as Korean characters, Japanese characters, Spanish characters, or Arabic characters, to name a few. The browser interface (11) may realize and perform matching to the pre-stored URL entries in the respective characters other than the Chinese characters.

The link control module (112) may respond to the user's selection command instruction of a particular matched pre-stored URL entry from among the one or more matched pre-stored URL entries in the generated URL entry list, and links the particular matched pre-stored URL entry to a corresponding web page. More specifically, the link control module (112) may aim at the generated URL entry list and respond to the input characters to confirming user's instruction in the input box (20) of the address bar on the browser interface (11), so as to link the webpage of the URL of the URL entry corresponding to the selection instruction or command, and link the webpage of the URL corresponding to the characters inputted in the input box of address bar.

For example, the URL entity list (40) as shown in FIG. 4 and the URL entity list (30) as shown in FIG. 5 illustrate that if the user's selection instruction corresponds to the URL entry of "www.sina.com.cn (新浪)", the link control module (112) may respond to the selection instruction to link the webpage of corresponding URL "www.sina.com.cn". If the user provides the input character confirming instruction (for example, click the "GO" function button to activate the input character confirming instruction), the link control module (112) may point at the input characters (such as "www.s" or the appended "www.sina.com.cn") in the input box (20) of the address bar on the browser interface (such as the input box (20) of address bar shown in FIG. 5). The link control module (112) may respond to the input character confirming instruction or command to link to the webpage which corresponds to "www.s" or the appended "www.sina.com.cn" URL entry.

Figure 3:
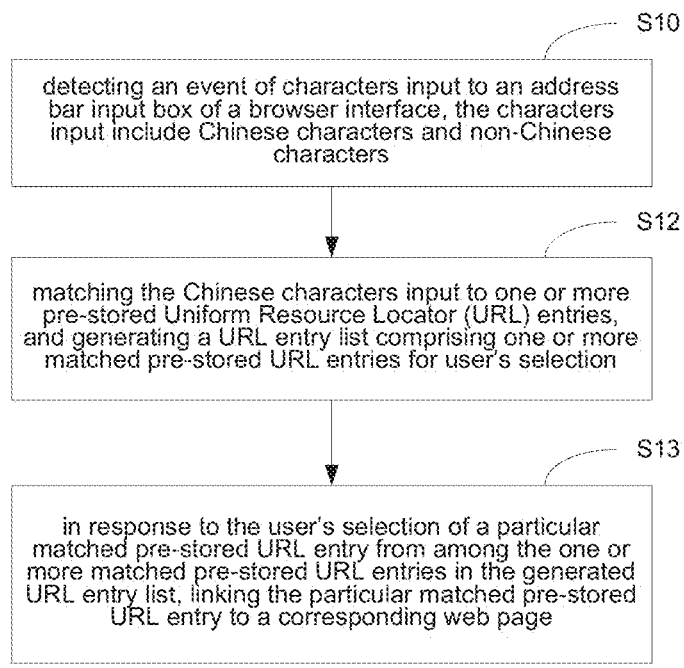
FIG. 3 is a flow chart illustrating an exemplary method for controlling browser interface address bar input, according to an embodiment of the present disclosure.

FIG. 3 is a flow chart illustrating an exemplary method for controlling browser interface address bar input, according to an embodiment of the present disclosure. The method may include the following exemplary steps:

Step S10: detecting an event of characters input to an address bar input box (20) of a browser interface (11), wherein, the characters input include Chinese characters and non-Chinese characters.

Step S12: matching the Chinese characters input to one or more pre-stored Uniform Resource Locator (URL) entries, and generating a URL entry list comprising one or more matched pre-stored URL entries which comprises non-English characters for user's selection.

For example, the method of matching pre-stored URL entries with inputted Chinese characters of "新" (phonetically pronounced as "XIN") in the input box (20) of address bar, may include: the URL matching module (111) matches to titles such as "www.sina.com.cn" (i.e., sina or 新浪), "m.weibo.com" (i.e., Sina Microblog or 新浪微博), "ent.sina.com.cn" (i.e., Sina Entertainment or 新浪娱乐), "sports.sinacom.cn" (i.e., Sina Sports or 新浪体育), etc. as shown in FIG. 4.

Step S13: in response to the user's selection of a particular matched pre-stored URL entry from among the one or more matched pre-stored URL entries in the generated URL entry list, linking the particular matched pre-stored URL entry to a corresponding web page.

For example, referring to the URL entry list (40) shown in FIG. 4 and the URL entity list (30) shown in FIG. 5, if the user's selection instruction corresponds to the URL entry of "www.sina.com.cn" (i.e., sina or 新浪), it responds to the selection instruction to link the webpage of corresponding URL "www.sina.com.cn"; if the user confirms the input character (for example, click the "GO" function button to activate the input character confirming instruction) aiming at the input characters (such as "www.s" or added "www.sina.com.cn") in the input box (20) of the address bar on the browser interface (such as the input box (20) of address bar shown in FIG. 5), it responds to the input character confirming instruction to link the webpage of corresponding "www.s" or added "www.sina.com.cn".

It shall be noted that if no pre-stored URL entry is matched with the inputted characters when non-Chinese characters are inputted in the input box (20) of address bar, the method may also include the step of analyzing if the characters inputted in the input box of address bar are Chinese ones.

Further, in order to reduce the user's operation of inputting characters in the input box of the address bar on the browser interface, the method may also include the step: when the inputted characters (such as the Chinese character of 新 "Xin" or "www.s") are matched with the beginning portion of URL or the title of the URL entity (such as "www.sina.com.cn (i.e., sina or 新浪)" in a specific position (such as the first place or the beginning portion) in the generated URL entry list, appending to the part other than the beginning of the URL or the title (201) (such as the Chinese character of "浪" phonetically pronounced as "LANG", as shown in FIG. 4 or "ina.com.cn" shown in FIG. 5) of the URL entry in the specific position to the end of the characters (such as the Chinese character of 新 "XIN" as shown in FIG. 4 or "www.s" shown in FIG. 5) inputted in the input box (20) of the address bar on the browser interface (11).

Further, in order to realize the matching with the pre-stored URL entry even when non-Chinese characters (such as the English characters input "www.s" as shown in FIG. 5) is inputted in the input box (20) of address bar. The method may also include the step: matching the pre-stored URL entries with the inputted non-Chinese characters, and generating a URL entry list for user's selection according to the matched pre-stored URL entries. Alternately, the URL entry selection may be performed automatically by the terminal, for example, when the input characters are generated through a native application (14) running on the terminal (1), a web application running on a web server (30), or through a voice command interface (12) after voice to text conversion.

Of course, in other embodiments of the present disclosure, when non-Chinese characters (such as the English characters input "www.s" shown in FIG. 5) are inputted in the input box (20) of address bar, the matching with the pre-stored URL entries may not be performed. When non-Chinese characters are inputted in the input box of address bar, it may realize the matching of pre-stored URL entries with the inputted non-Chinese characters.

The steps in the various methods in the aforementioned embodiments may be completed via programs, which command corresponding hardware. Such programs may be stored in a non-transitory computer-readable memory medium. The non-transitory computer-readable memory medium may include: flash memory disk, read-only memory (ROM), random access memory (RAM), disk or compact disk, etc.

Disclosed above are only preferred embodiments of the present disclosure and these preferred embodiments are not intended to be limiting the scope of rights of the present disclosure, hence any equivalent changes made according to the claims of the present disclosure shall fall within the scope of the present disclosure.

What is claimed is:

1. An improved method for controlling mixed languages address input, comprising:
    receiving by a mobile terminal device, an event of characters input to an address input, the event of characters input comprising combined data including a URL portion and a title corresponding to the URL portion, wherein the event of characters input include both Chinese characters portion and non-Chinese characters portion, and the non-Chinese characters portion is selected from a spoken language comprises at least one of: English, Korean, Spanish, Japanese, French, German, Hebrew and Arabic;
    matching only the Chinese characters portion input from the title corresponding to the URL portion of the address input in the event of characters input to one or more pre-stored Uniform Resource Locator (URL) entries that match the title corresponding to the URL portion of the address input, wherein the pre-stored URL entries were previously stored locally in the mobile terminal device, generating a URL entry list according to only the matched Chinese characters portion from the title corresponding to the URL portion, the URL entry list comprising one or more matched pre-stored URL entries, wherein the title corresponding to the URL portion comprises at least the Chinese characters portion for user's selection; and
    in response to the URL entry from among the one or more matched pre-stored URL entries, linking a particular matched pre-stored URL entry to a corresponding web page, wherein if more than one matched title portion is found among the more than one pre-stored URL entries, the particular matched pre-stored URL entry is selected according to a priority ranking sets to the one or more matched pre-stored URL entries, having historical URL entries being highest priority, URL entries or bookmark or favorites being a next priority and URL entries of the frequently visited or common websites being a least priority.

2. The method according to claim 1, wherein the matching of the Chinese characters portion input from the title corresponding to the URL portion to the one or more pre-stored URL entries, comprising:
    matching the title corresponding to the URL portion from among the pre-stored URL entries to a title comprising both of: Chinese characters and non-English characters from the characters input; and
    setting the matched title corresponding to the URL portion corresponding to the pre-stored URL entry being the pre-stored URL entry matching to the both of: Chinese characters and non-English characters input.

3. The method according to claim 1, wherein the generating of the URL, comprising:
    categorizing the pre-stored URL entries into different URL entry priority sets, wherein the URL entry priority sets comprise sets of common web sites URL entries;
    categorizing a respective priority for each of the pre-stored URL entries; and
    generating the URL entry list according to a respective priority order of the matched pre-stored URL entry in a high-to-low order according to their priorities.

4. The method according to claim 1, wherein after the receiving of the event of non-Chinese characters portion input to the address input, the method further comprising:
    matching the non-Chinese characters portion input to the one or more pre-stored Uniform Resource Locator (URL) entries, and generating a URL entry list comprising one or more matched pre-stored URL entries which comprises the non-Chinese characters for user's selection.

5. The method according to claim 1, further comprising:
    matching only the Chinese characters portion input from the title corresponding to the URL portion to the address input to one of: a website corresponding to a specific location or a beginning portion of a title of the matched pre-stored URL entry in the generated URL entry list; and
    appending one of: a portion other than the beginning portion of the matched pre-stored URL entry, or a title of the matched pre-stored URL entry at the specific location right after the Chinese characters portion input in the address input.

6. The method according to claim 1, wherein the address input being through anyone of: a terminal browser interface, a voice command interface, a web application or a native application.

7. An improved system for controlling mixed languages address input, comprises at least a processor operating in conjunction with at least a memory which stores instruction codes operable as plurality of modules, wherein the plurality of modules comprise:
    an input detecting module, which detects an event of characters input to an address input, the event of characters input comprising combined data including a URL portion and a title corresponding to the URL portion, wherein the event of characters input include both Chinese characters portion and non-Chinese characters portion, and the non-Chinese characters portion is selected from a spoken language comprises at least one of: English, Korean, Spanish, Japanese, French, German, Hebrew and Arabic;

a URL matching module, which matches only the Chinese characters portion input from the title corresponding to the URL portion of the address input in the event of characters input to one or more pre-stored Uniform Resource Locator (URL) entries that match the title corresponding to the URL portion of the address input, wherein the pre-stored URL entries were previously stored locally in the mobile terminal device, generating a URL entry list according to only the matched Chinese characters portion from the title corresponding to the URL portion, the URL entry list comprising one or more matched pre-stored URL entries, wherein the title corresponding to the URL portion comprises at least the Chinese characters portion for user's selection; and a link control module, which responds to the URL entry from among the one or more matched pre-stored URL entries, linking the particular matched pre-stored URL entry to a corresponding web page, wherein if more than one matched title portion is found among the more than one pre-stored URL entries, the particular matched pre-stored URL entry is selected according to a priority ranking sets to the one or more matched pre-stored URL entries, having historical URL entries being highest priority, URL entries or bookmark or favorites being a next priority and URL entries of the frequently visited or common websites being a least priority.

8. The system according to claim 7, wherein when matching of the Chinese characters portion input from the title corresponding to the URL portion to the one or more pre-stored URL entries, the URL matching module further performs:

matching the title corresponding to the URL portion from among the pre-stored URL entries to a title comprising both of: Chinese characters and non-English characters from the characters input; and setting the matched title corresponding to the URL portion corresponding to the pre-stored URL entry being the pre-stored URL entry matching to the both of: Chinese characters and non-English characters input.

9. The system according to claim 7, wherein when generating the URL, the URL matching module further performs:

categorizing the pre-stored URL entries into different URL entry priority sets, wherein the URL entry priority sets comprise sets of common web sites URL entries;

categorizing a respective priority for each of the pre-stored URL entries; and generating the URL entry list according to a respective priority order of the matched pre-stored URL entry in a high-to-low order according to their priorities.

10. The system according to claim 7, wherein the URL matching module further performs:

matching the non-Chinese characters portion input to the one or more pre-stored Uniform Resource Locator (URL) entries, and generating a URL entry list comprising one or more matched pre-stored URL entries which comprises non-Chinese characters for user's selection.

11. The system according to claim 7, wherein the URL matching module further performs:

matching only the Chinese characters portion input from the title corresponding to the URL portion to the address input to one of: a website corresponding to a specific location or a beginning portion of a title of the matched pre-stored URL entry in the generated URL entry list; and appending one of: a portion other than the beginning portion of the matched pre-stored URL entry, or a title of the matched pre-stored URL entry at the specific location right after the Chinese characters portion input in the address input.

12. The system according to claim 7, wherein the address input being through anyone of: a terminal browser interface, a voice command interface, a web application or a native application.

13. A non-transitory computer-readable medium having stored thereon, a computer program having at least one code section being executable by a mobile terminal which causes the mobile terminal to perform steps for improving controlling mixed languages address input, comprising:

receiving an event of characters input to an address input, the event of characters input comprising combined data including a URL portion and a title corresponding to the URL portion, wherein in the event of characters input include both Chinese characters portion and non-Chinese characters portion, and the non-Chinese characters portion is selected from a spoken language comprises at least one of: English, Korean, Spanish, Japanese, French, German, Hebrew and Arabic;

matching only the Chinese characters portion input from the title corresponding to the URL portion of the address input in the event of characters input to one or more pre-stored Uniform Resource Locator (URL) entries that match the title corresponding to the URL portion of the address input, wherein the pre-stored URL entries were previously stored locally in the mobile terminal device, and generating a URL entry list according to only the matched Chinese characters portion from the title corresponding to the URL portion, and the URL entry list comprising one or more matched pre-stored URL entries, wherein the title corresponding to the URL portion comprises at least the Chinese characters portion for user's selection; and in response to the URL entry from among the one or more matched pre-stored URL entries, linking a particular matched pre-stored URL entry to a corresponding web page, wherein if more than one matched title portion is found among the more than one pre-stored URL entries, the particular matched pre-stored URL entry is selected according to a priority ranking sets to the one or more matched pre-stored URL entries, having historical URL entries being highest priority, URL entries or bookmark or favorites being a next priority and URL entries of the frequently visited or common websites being a least priority.

14. The non-transitory computer-readable medium according to claim 13, wherein the matching of the Chinese characters portion input from the title corresponding to the URL portion to the title portion of the one or more pre-stored URL entries, comprising:

matching the title corresponding to the URL portion from among the pre-stored URL entries to a title comprising both of: Chinese characters and non-English characters from the characters input; and setting the matched title corresponding to the URL portion corresponding to the pre-stored URL entry being the pre-stored URL entry matching to the both of: Chinese characters and non-English characters input.

15. The non-transitory computer-readable medium according to claim 13, wherein the step of generating the URL, comprising:
- categorizing the pre-stored URL entries into different URL entry priority sets, wherein the URL entry priority sets comprise sets of common web sites URL entries;
- categorizing a respective priority for each of the pre-stored URL entries; and
- generating the URL entry list according to a respective priority order of the matched pre-stored URL entry in a high-to-low order according to their priorities.

16. The non-transitory computer-readable medium according to claim 13, wherein after the receiving of the event of non-Chinese characters portion input to the address input, the method further comprising:
- matching the non-Chinese characters portion input to the one or more pre-stored Uniform Resource Locator (URL) entries, and generating a URL entry list comprising one or more matched pre-stored URL entries which comprises the non-Chinese characters portion for user's selection.

17. The non-transitory computer-readable medium according to claim 13, further comprising:
- matching only the Chinese characters portion input from the title corresponding to the URL portion to the address input of the browser interface to one of: a website corresponding to a specific location or a beginning portion of a title of the matched pre-stored URL entry in the generated URL entry list; and
- appending one of: a portion other than the beginning portion of the matched pre-stored URL entry, or a title of the matched pre-stored URL entry at the specific location right after the Chinese characters portion input in the address input.

18. The non-transitory computer-readable medium according to claim 13, wherein the address input being through anyone of: a terminal browser interface, a voice command interface, a web application or a native application.

* * * * *